United States Patent [19]

Robben

[11] Patent Number: 4,558,664

[45] Date of Patent: Dec. 17, 1985

[54] SUPERHEATED FUEL INJECTION FOR COMBUSTION OF LIQUID-SOLID SLURRIES

[75] Inventor: Franklin A. Robben, Berkeley, Calif.

[73] Assignee: The United States of America as represented by the United States Department of Energy, Washington, D.C.

[21] Appl. No.: 662,658

[22] Filed: Oct. 19, 1984

[51] Int. Cl.[4] .............................................. F02B 45/02
[52] U.S. Cl. .................................... 123/23; 110/261; 431/11
[58] Field of Search .................. 123/23, 254; 110/261, 110/263; 431/11, 157

[56] References Cited

U.S. PATENT DOCUMENTS

| 2,625,141 | 1/1953 | Berlyn | 123/25 |
|---|---|---|---|
| 2,669,509 | 2/1954 | Sellers | 48/206 |
| 3,229,651 | 1/1966 | Wasp | 110/7 |
| 3,589,314 | 6/1971 | Tratz et al. | 431/208 |
| 3,682,114 | 8/1972 | Scheubel | 122/7 R |
| 3,996,026 | 12/1976 | Cole | 48/197 R |
| 4,335,684 | 6/1982 | Davis | 123/23 |

OTHER PUBLICATIONS

"Behavior of Suspended Coal-Water Slurry Droplets in a Combustion Environment", Shi-Chune Yao et al., Combustion and Flame, 51:335—345 (1983)
"Coal-Fueled Diesel Engines", F. Robben, LBL-16622, presented at S.A.E.F. and L. Meeting Oct. 31-Nov. 4, 1983.
"Will Future Medium Diesels Burn Coal ?", F. Robben, S.A.E., vol. 92, No. 2, Feb. 1984.
"Ignition & Combustion of Coal-Water Slurry in an Experimental Diesel Engine", F. Robben et al., LBL-17721, 6th Inter. Symposium on Coal Slurry Combustion and Technology, Jun., 1984.

Primary Examiner—William A. Cuchlinski, Jr.
Attorney, Agent, or Firm—L. E. Carnahan; Roger S. Gaither; Judson R. Hightower

[57] ABSTRACT

A method and device for obtaining, upon injection, flash evaporation of a liquid in a slurry fuel to aid in ignition and combustion. The device is particularly beneficial for use of coal-water slurry fuels in internal combustion engines such as diesel engines and gas turbines, and in external combustion devices such as boilers and furnaces. The slurry fuel is heated under pressure to near critical temperature in an injector accumulator, where the pressure is sufficiently high to prevent boiling. After injection into a combustion chamber, the water temperature will be well above boiling point at a reduced pressure in the combustion chamber, and flash boiling will preferentially take place at solid-liquid surfaces, resulting in the shattering of water droplets and the subsequent separation of the water from coal particles. This prevents the agglomeration of the coal particles during the subsequent ignition and combustion process, and reduces the energy required to evaporate the water and to heat the coal particles to ignition temperature. The overall effect will be to accelerate the ignition and combustion rates, and to reduce the size of the ash particles formed from the coal.

14 Claims, 2 Drawing Figures

SUPERHEATED FUEL INJECTION FOR COMBUSTION OF LIQUID-SOLID SLURRIES

The invention described herein arose in the course of, or under, Contract No. DE-AC03-76SF00098 between the University of California and the U.S. Department of Energy.

BACKGROUND OF THE INVENTION

The invention relates to combustion of slurry fuel, particularly to the combustion of liquid-coal slurry fuels, and more particularly to a device by which is obtained flash evaporation of the liquid in a slurry fuel thereby aiding the ignition and combustion of the fuel.

Pulverized coal is widely used as a fuel for boilers and furnaces. Also, engines, such as the diesel and gas turbine types, have been designed for using pulverized coal, but have not been developed sufficiently for commercial utilization. For a brief review of the prior efforts relative to the development of engines using coal as a fuel, attention is directed to a paper LBL-16622 entitled "Coal-Fuel Diesel Engines", F. Robben, presented at the Society of Automotive Engineers Fuels and Lubricants Meeting, San Francisco, Calif., Oct. 31—Nov. 4, 1983.

As the result of increased fuel consumption and the current oil reserve, there has recently been a renewed interest in the use of coal, particularly due to the increasing cost of oil and the existence of large coal reserves in the United States. A major problem associated with the increased use of coal, especially for smaller installations, is the cost of the delivery of coal and the cost and complexity for coal handling and crushing equipment.

Efforts to resolve the above problem, include the preparation and delivery of pulverized coal in the form of a liquid slurry (coal-water), which are being rapidly developed and promise a cost-effective, safe and environmentally sound method for coal transportation, storage and distribution. A coal refining industry is arising that will clean the coal of undesirable foreign matter and will pulverize, prepare and treat the coal-water slurry to achieve desirable liquid, storage and combustion properties. The most immediate application is for conversion of oil and gas boilers and furnaces to coal slurry fuel, but substantial efforts are underway for development of engines, such as diesel and gas turbine, for using a coal slurry fuel.

Two problems are associated with the combustion of coal slurry (coal-water) fuels. These problems are delayed ignition, due to the energy needed to evaporate the water, and the agglomeration of small coal particles into larger particles during the combustion process. Both problems were anticipated and have been demonstrated in various combustion tests and other experiments. Thus, a need has existed for methods or means of resolving these two problems.

Therefore, it is an object of this invention to reduce the magnitude of the problems associated with combustion of coal-liquid slurry fuels by improving atomization and minimizing energy required for ignition.

A further object of the invention is to at least reduce the magnitude of the coal-water slurry fuel combustion problems (e.g. ignition delay) by preheating the slurry to reduce ignition energy, and by improving the atomization so that each spray droplet contains few coal particles.

Another object of the invention is to provide a method and apparatus which produces flash evaporation of the liquid in a liquid-coal slurry fuel thereby aiding in ignition and combustion of the fuel.

Another object of the invention is to provide means for accelerating the ignition and combustion rates of water-coal fuel and for reducing the size of the ash particles formed from the coal.

Another object of the invention is to provide a method and means for preventing delayed ignition of a water-coal slurry fuel and reducing agglomeration of coal particles in the fuel.

Other objects of the invention will become readily apparent from the following description and accompanying drawings.

SUMMARY OF THE INVENTION

The above objects and advantages of the present invention are carried out by a method and apparatus which obtains, upon injection, flash evaporation of the liquid in a liquid-coal slurry fuel thereby improving both ignition and combustion of the fuel. The slurry (water-coal) fuel is heated under pressure to near the critical temperature in an injector accumulator, where the pressure is sufficiently high to prevent boiling. The thus heated slurry fuel is then injected into a combustion chamber, with the water temperature being well above the boiling point at the reduced pressure existing in the combustion chamber, and a portion of the water will instantaneously boil. The boiling of the water preferentially takes place at solid-liquid surfaces, resulting in the shattering of the water droplets and the subsequent separation of the water from the coal particles. This prevents the agglomeration of the coal particles during the subsequent ignition and combustion process, and reduces the energy required to evaporate the water and to heat the coal particles to ignition temperature. The overall effect of the present invention is to accelerate the ignition and temperature rates of water-coal slurry fuel, and to reduce the size of the ash particles formed from the coal.

More specifically the present invention involves a superheated fuel injection device for liquid-coal slurry fuels, particularly adapted for internal combustion engines (diesel and gas turbine), but can be utilized in external combustion systems, such as boilers and furnaces. An embodiment of the apparatus for carrying out the invention comprises a coal-water slurry fueled diesel engine having a superheated fuel injection system. The injection system which is mounted to a combustion chamber of the engine includes an injection pump connected by valving to a coal-water slurry reservoir and which is connected via a high pressure accumulator to an injector valve arrangement movably positioned in an injector nozzle and around which is positioned a heater, the injector valve arrangement includes the accumulator which includes a high pressure bellows. The slurry fuel is directed into the injector valve arrangement under high pressure and is heated to near the critical temperature prior to injection thereof into the combustion chamber of the engine.

DETAILED DESCRIPTION OF THE INVENTION

Figure 1:
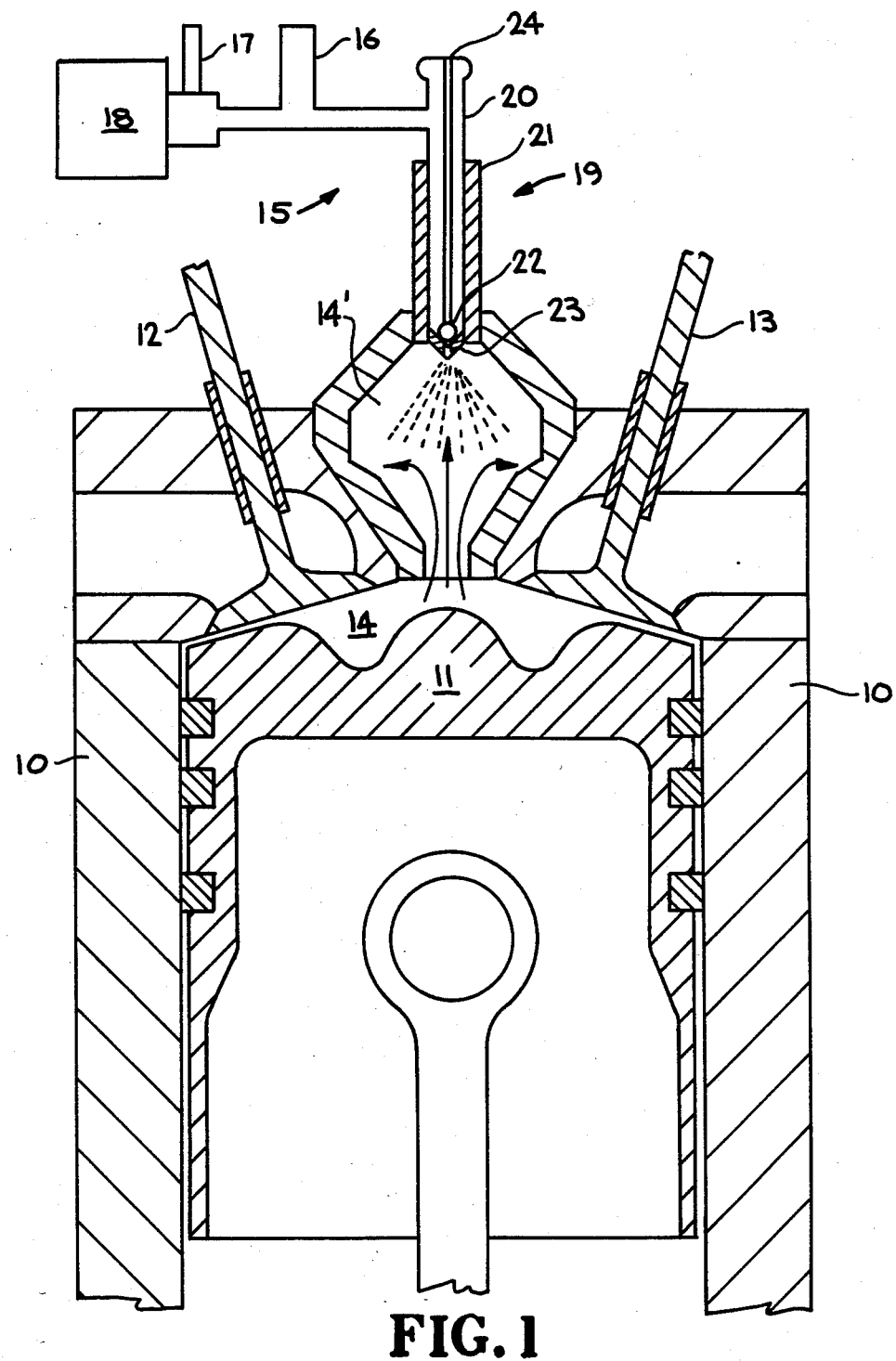
FIG. 1 illustrate an embodiment of the superheated slurry fuel injection apparatus of the invention mounted to a combustion chamber of a diesel engine.

The present invention is directed to a method and apparatus for reducing the magnitude of the problems associated with the combustion of liquid-coal slurry fuel; namely, delayed ignition due to the energy needed to evaporate the liquid, and the agglomeration of coal particles into larger particles during the combustion process. These prior problems are essentially overcome by preheating the slurry fuel prior to injection to reduce the ignition energy, and by improving the atomization so that each spray droplet contains fewer coal particles.

The reduced time for ignition, provided by the present invention, is especially important for diesel engine and gas turbine applications, where the time available for combustion is quite short. Perhaps more important is the improved atomization of the coal-liquid slurry as it is sprayed into the combustion chamber. Since it appears from testing and other experiments that the coal particles in each spray droplet will agglomerate into a single particle during the evaporation and ignition phase of the combustion process, there should ideally be only one coal particle in each spray droplet. This would result in the minimum coal particle size to be burned. Small coal particle size has two benefits that are very important to projected diesel engine and gas turbine applications, and probably of significant importance for boiler and furnace applications: first, the coal will burn faster, resulting in a shorter combustion time; and second, the ash remaining after combustion, resulting from the fraction of coal that is not combustible, will be smaller in size. For diesel and gas turbines, the finer ash will significantly reduce the wear and erosion associated with coal utilization. In addition, more rapid ignition significantly increases the power output of a given sized engine.

Another area of application of the present invention is in the combustion of high specific energy slurry fuels, such as a boron slurry. There is presently considerable interest in these fuels for specialized aircraft propulsion systems. These systems require rapid combustion and good atomization, which will be improved by the use of a superheated fuel injection system made in accordance with this invention.

The basic principle of the superheated fuel injection device of the present invention is to create very rapid boiling of the liquid (water), called flash-boiling, upon injection of the slurry into the combustor. This results when the pressure is suddenly reduced and the temperature of the liquid is above the boiling point. The boiling point of liquids increases with pressure, and by compressing the liquid to a high pressure, the temperature can be raised well above the boiling temperature at the pressure conditions in the combustor. When this superheated liquid is sprayed into the combustor, the pressure is suddenly reduced and boiling will take place spontaneously at sites within the liquid volume. The preferred sites of the liquid boiling are discontinuities in liquid properties, such as solid-liquid interfaces around the coal particles. The initial internal boiling takes place on the surfaces of the coal particles, and with considerable energy. This results in the shattering of the spray droplet into smaller pieces which will contain only one coal particle each.

An important technical problem when using a coal-water slurry fuel in a diesel engine is the time required to ignite the fuel. The diesel engine cycle operates by compressing a fresh charge of air in the cylinder, thereby heating it to a temperature in the range of 600° C., injecting the fuel into the heated air, with fuel combustion taking place during the expansion of the power stroke, and extracting the mechanical power during the power stroke from the increased gas pressure resulting from combustion. In this cycle sequence, the coal-water slurry must be ignited in a time varying from 2 to 25 milliseconds, corresponding to engine speed from 2000 to 120 RPM. Thus, decreasing the ignition time, provides a significant advantage for the diesel engine time rate or speed as accomplished by the present invention.

Figure 2:
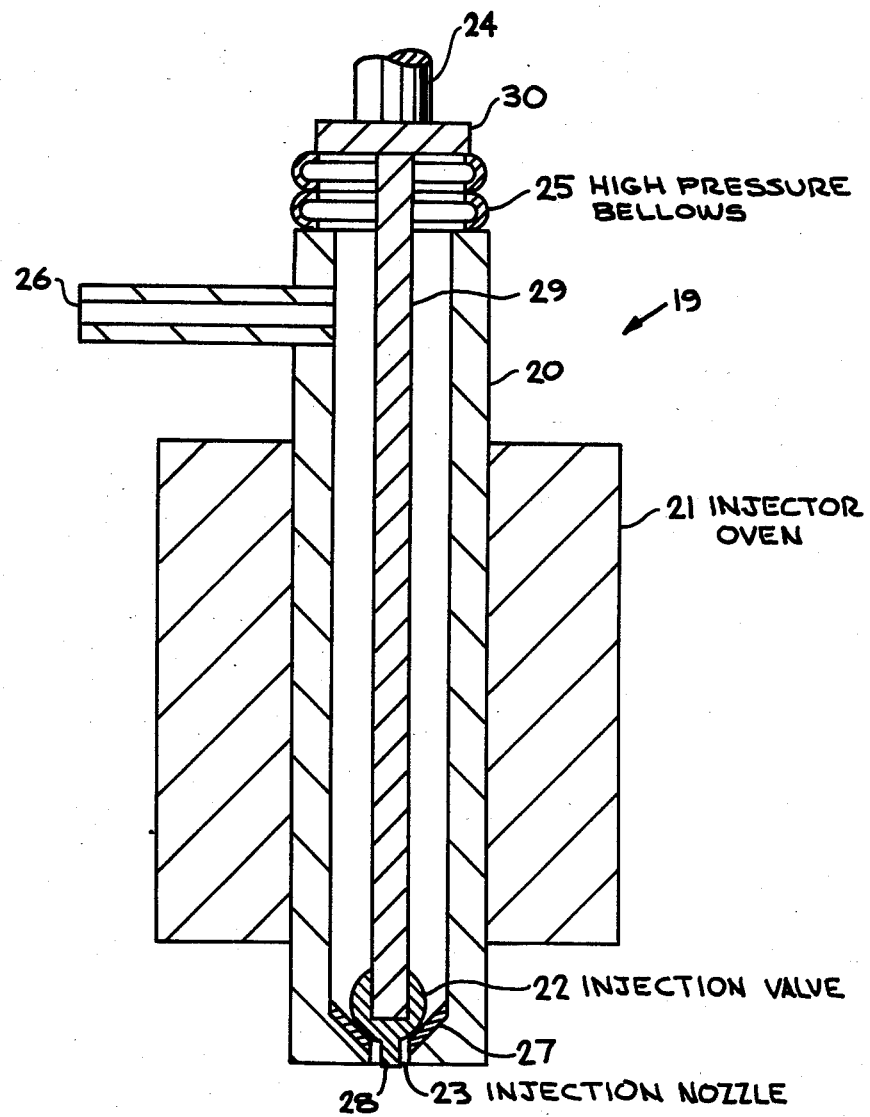
FIG. 2 illustrates in cross section an embodiment of the injector accumulator, oven, nozzle and valve arrangement of the FIG. 1 apparatus.

Referring now to the drawings, FIG. 1 illustrates an embodiment of the superheated fuel injection system of the invention for application to a diesel engine. The embodiment of FIG. 1 involves a powerhead design for a coal-water slurry fuel diesel engine, with the superheated slurry injection system being shown schematically, while FIG. 2 illustrates in detail an embodiment of the injector accumulator, oven, nozzle and valve portion of the FIG. 1 injection system. The illustrated system uses a high pressure accumulator arrangement to maintain the slurry fuel pressure at 100–250 atmospheres or greater, and an injection pump to increase the fuel pressure for injection. The oven and injector, operating at a temperature of about 300°–360° C., heats the fuel before injection. The portion of the injector body which is heated contains internal fins (not shown) to increase the heat transfer rate to the fuel. The injector is thermally insulated so that it is at a uniform temperature, including the injector valve and nozzle. The injection is controlled by opening the injection valve by an associated control mechanism, with the amount of injection being determined by the length of time the valve is opened.

The coal-water slurry fueled diesel engine equipped with the superheated injection system shown in FIG. 2 comprises a conventional diesel engine, only one cylinder being illustrated in FIG. 1. As illustrated the engine comprises a cylinder 10 having a piston 11 movably mounted therein, an intake valve 12, an exhaust valve 13, and a combustion chamber 14, with an interconnected pre-combustion chamber 14'. The valves 12 and 13, combustion chamber 14 and pre-combustion chamber 14' are mounted in the head of cylinder 10, as known in the art. Mounted at the top of the pre-combustion chamber 14' is a superheated slurry fuel injection system or apparatus, generally indicated at 15. The superheated injection system 15 basically consists of an injection pump 16 connected via a valve mechanism 17 to a coal-water slurry fuel reservoir 18, injection pump 16 directing its output at a pressure of 100–250 atm., for example, into an injector accumulator-oven-valve-nozzle mechanism, generally indicated at 19. Mechanism 19 consists basically of an accumulator 20, an oven 21, an injection valve 22 and an injection nozzle 23, as shown in detail in FIG. 2. The injection valve 22 is connected as indicated at 24 to an activating mechanism (not shown), which may be an electronically or mechanically controlled mechanism. The accumulator 20 includes a high pressure bellows 25, with pressurized coal-water slurry fuel being supplied via inlet 26. A seat 27 for injection valve 22 is secured in accumulator 20 adjacent to injection nozzle 23, and may, for example, be constructed of hardened steel, sapphire, or alumina.

The injection valve 22 includes a protruding tip 28 which extends into injection nozzle 23, and valve 22 is connected to the activating mechanism 24 by a rod 29 via an end member 30 of bellows 25.

By way of example, the accumulator 20 may be constructed of steel or alumina and have a capacity of 100 mm$^3$ to 10 cm$^3$, with the bellows 25 allowing an expansion of 1 mm$^3$ to 10 mm$^3$. The injector oven may be of the electrical or heat-pipe type capable of controlling the temperature of the coal-water slurry fuel in a range of 200° to 350° C. The injection valve 22 may, for example, be of a spherical or ball configuration constructed of sapphire, alumina, or cobalt alloy, with a diameter of 5 mm to 2 cm, and with protruding tip 28 having a length of 1 mm to 5 mm and cross-section of 1 mm$^2$ to 5 mm$^2$. The connecting rod 29 and bellows end member 30 may be constructed of steel, with the expandable wall of bellows 25 being made of monel or steel. The injection nozzle 23 may have a cross-section of 2 mm$^2$ to 50 mm$^2$.

Table I sets forth an example of the basic specifications of a diesel engine and coal-water slurry fuel in which the superheated injection system of this invention can be utilized:

TABLE I

| Engine Specifications | |
|---|---|
| Four stroke, turbocharged | |
| Bore | 25 cm |
| Stroke | 28 cm |
| Speed | 1000 rpm |
| Power | 200 kW/cylinder |
| Fuel Specifications | |
| Stabilized coal-water slurry | |
| Coal particle mean size: 10 to 20 microns | |
| 50%–60% coal by weight | |
| Beneficiated to ~3% foreign matter | |
| High volatile, high reactivity coal | |

Table II sets forth an example of the injection conditions of the superheated coal-water slurry fuel in an engine exemplified above:

TABLE II

| Critical point for water: | $T_{crit}$ = 374° C. |
| --- | --- |
| | $P_{crit}$ = 218 atm |
| Injector accumulator conditions | $T_{acc}$ = 360° C. |
| | $P_{acc}$ = 240 atm |
| Cylinder conditions | $P_{cyl}$ = 38 atm |
| | $T_{sat}$ = 248° C. |
| Percentage water which will flash to vapor | 36% |
| Percentage water evaporated from heat in coal | 7% |

As indicated above in Table 2, about 36% of the water in the slurry fuel will "flash" boil and an additional 7% will boil due to the heat in the coal particles. These effects will significantly accelerate the heating of the coal to ignition by the hot compressed air of the intake cycle of the engine.

The effect of superheated boiling on liquid fuel sprays has been investigated both experimentally and analytically. Those results support the general behavior described above. For further discussion of the coal-water slurry fuel and the injection conditions, attention is directed to above referenced paper LBL-16622.

Embodiments of the invention suited for continuous combustion application, such as gas turbines, boiler and furnaces, would normally operate with a continuous injection rate. Small injection orifices and high injection pressure is necessary to achieve superheated injection in these applications. The use of air blast atomization, as is common for such applications, is likely to be unnecessary and, further, it would result in cooling of the superheated spray, prior to entering the combustion region. However, the use of preheated air for atomization, especially for atmospheric pressure combustion as in boilers and furnaces, may be beneficial.

For gas turbine applications, the combustion pressure will be lower than in a diesel engine, in the range of 20 atm., resulting in a larger fraction of the water which will "flash" boil. For atmospheric pressure combustors, all the water can be evaporated by flash boiling. The pressures and temperatures exemplified above for use in the diesel engine may be lower for gas turbine and atmospheric pressure combustors.

The rate of boiling, under superheated conditions, is very rapid and basically limited by the dynamics of liquid motion and by the heat transfer rate to the boiling surface. For an internally growing bubble, the surrounding fluid must move to accommodate the gaseous bubble, the pressure must drop to allow boiling to occur, and heat must be conducted through the liquid to the boiling surface. Rough calculations for a 500 micron diameter slurry droplet, containing 10 micron diameter coal particles at 50% concentration by weight, indicate that it should double in diameter in a few microseconds, and will be limited in growth by both dynamic and thermal conductivity effects. Based on these estimates, the flash boiling effect appears to be much faster than the development of the spray (the liquid velocity is about 104 cm/sec).

In order to operate under part-load conditions, the fuel injection rate must be reduced, but the fuel pressure cannot be reduced as the superheated conditions could not then be maintained. This can be accomplished using the invention by electronically controlling the injection valve, as shown in FIG. 2, and adjusting the "on" portion of the duty cycle to meter the fuel. A continuous combustor injector system would be very similar in design to that shown in FIG. 2.

Special arrangements for starting and shut-down of superheated coal-water slurry combustion systems will be necessary. Before slurry injection, it will be necessary to preheat and pressurize the injection system. If the coal slurry is sufficiently stabilized and will not agglomerate during heating, in some cases it will be helpful to preheat the injector and start the engine directly on the slurry. However, upon shutdown it will be necessary to flush the slurry out of the injector region. If not, even in the absence of any agglomeration, it is likely that there will be some leakage and evaporation of the liquid portion of the slurry at the injection nozzle, which will result in plugging of the injector. Thus, the system will need to be flushed with either water or oil.

Starting and shutdown of the combustion system on oil is believed preferable for satisfactory operation. The heating and cooling of the injection system can then be accomplished partially during oil operation, and partially while operating on the slurry.

The salient features of the invention are as follows:

A. Superheated coal-water slurry injection into a combustion chamber will have the following positive effects on coal-water slurry combustion in diesel engines, gas turbines, furnaces, and other combustion devices as follows:

1. High temperature preheat will speed the evaporation of water by requiring less heat and thereby shortening the ignition time.
2. Flash boiling of the spray will occur. This will take place at the solid-liquid interfaces and, under the right conditions, will explosively shatter the droplets so that the coal particles are separated and the spray is finely atomized.
3. The finer atomization of the spray will reduce the degree of agglomeration of coal particles during the heating and ignition process, resulting in smaller coal particles, more rapid ignition, and more rapid combustion and burnout of the coal particles.
4. Less agglomeration of the coal particles will reduce the size of the ash remaining after the combustion of the coal particles. This finer ash will minimize the wear and erosion problems associated with the use of coal in diesel engines and gas turbines.

B. Superheated coal-water slurry injection into a combustion chamber will be accomplished using one or more of the following:
1. Accumulator type injection system operating at a reservoir pressure of up to about 250 atm, using either a mechanically or electronically controlled injection valve.
2. Pump operated injector, with a suitable pump such as a bellows seal type, and a pressure actuated injection valve.
3. Injector and injector barrel heated to approximately 360° C. Heated injector nozzle with suitable ceramic or other heat insulating material for mounting in combustion chamber.
4. Heat exchanger in injector barrel, providing sufficient heat transfer to heat the fuel as it is pumped through the injector.
5. Hard ceramic valve seat surfaces to resist wear and abrasion.
6. For continuous combustion systems, pulsed type fuel metering to maintain high fuel pressure in the heated portion of the accumulator.
7. Special heating system for the injector which will preheat and pressurize the injector for starting, and which will maintain a constant temperature and pressure over the operating range from idle to full load.

C. Different solid fuel components may be used, such as petroleum coke, graphite, and high energy solids such as boron. Different liquid components include alcohol and alcohol-water mixtures, various oils, and additives to enhance the fluid, storage, and combustion properties of the slurry.

It has thus been shown that the present invention provides an injection system, particularly for diesel cycle engines, which enables efficient and effective use of liquid-solid fuels, particularly a coal-water slurry fuel, in such an engine. This is accomplished by flash evaporation of the liquid thereby reducing the time and energy required to ignite and combust the fuel.

While a particular embodiment of the invention has been illustrated and described, modifications and changes will become apparent to those skilled in the art, and it is intended to cover in the appended claims all such modifications and changes that come within the scope of this invention.

What is claimed is:

1. A method for improving ignition and combustion of a liquid-coal slurry fuel comprising the steps of:
   supplying the liquid-coal slurry fuel to an accumulator at a pressure greater than the pressure in an associated combustion chamber into which the fuel is to be injected;
   heating the pressurized fuel in the accumulator to a superheated condition; and
   injecting the superheated fuel into a combustion chamber having a pressure lower than the pressure in the accumulator, whereby causing flash boiling of at least a portion of the liquid component of the liquid-coal slurry fuel, resulting in a shattering of liquid droplets of fuel and separation of the liquid from the coal particles of the slurry fuel, thereby substantially preventing agglomeration of the coal particles during subsequent ignition and combustion thereof.

2. The method of claim 1, additionally including the step of maintaining the liquid-coal slurry fuel in the accumulator at a pressure of about 100 to about 250 atmospheres.

3. The method of claim 1, additionally including the step of maintaining the liquid-coal slurry fuel in the accumulator at a temperature of about 300°–360° C.

4. The method of claim 1, additionally including the step of forming the liquid-coal slurry fuel from a mixture of water and 20 to 60 percent by weight of coal particles, with the coal particles having a size not to exceed 20 microns.

5. A superheated injection system for a liquid-coal slurry fuel comprising:
   a high pressure accumulator,
   means for supplying a liquid-coal slurry fuel under pressure to said accumulator,
   means for heating said accumulator for causing the slurry fuel under pressure in said accumulator to be heated near a point of boiling of a liquid component of said slurry fuel,
   means forming a nozzle at one end of said accumulator,
   valve means positioned in said accumulator and adapted to control fuel flow through said nozzle means, and
   means for actuating said valve means for injecting said heated high pressure fuel into an associated combustion chamber.

6. The system of claim 5, wherein said slurry fuel supplying means includes an injection pump operatively connected intermediate to a slurry fuel supply and said accumulator for supplying the slurry fuel to said accumulator at a pressure of about 100 to 250 atmospheres.

7. The system of claim 5, wherein said heating means comprises an oven positioned at least partially around said accumulator and constructed to heat said accumulator to a temperature of about 300° C. to about 360° C.

8. The system of claim 5, wherein said high pressure accumulator includes a high pressure bellows.

9. The system of claim 5, wherein said valve means includes a seat of hardened material secured to an inner section of said accumulator adjacent said nozzle forming means, an actuator member adapted to be seated on said seat of hardened material, a rod member connecting said actuator member with a movable end section of said accumulator, and actuator means for selectively moving said actuator means for selectively moving said actuator member away from said seat for allowing slurry fuel to be injected through said nozzle forming means into an associated combustion chamber.

10. The system of claim 9, wherein said actuator member has a generally spherical shape with a section protruding outwardly therefrom so as to extend into said nozzle forming means.

11. The superheated injection system of claim 5, in combination with an internal combustion type engine having a pre-combustion chamber, said injection system being mounted such that heated pressurized slurry fuel passing through said nozzle forming means of said injection system is directed into said pre-combustion chamber of said engine.

12. The superheated injection system of claim 11 wherein said injection system is directed into said associated combustion chamber.

13. The combination set forth in claim 11, wherein said internal combustion type engine is of a diesel cycle type.

14. The superheated injection system of claim 5, wherein the liquid-coal slurry fuel directed into said accumulator comprises a water-coal mixture having about 20-60 percent by weight coal particles having a size of not greater than 20 microns.

* * * * *